(12) United States Patent
Zhuang et al.

(10) Patent No.: US 11,182,080 B2
(45) Date of Patent: Nov. 23, 2021

(54) ADAPTIVE FILE STORAGE METHOD AND APPARATUS

(71) Applicant: HUAWEI TECHNOLOGIES CO., LTD., Guangdong (CN)

(72) Inventors: Shiyue Zhuang, Shenzhen (CN); Yulei Xiao, Shenzhen (CN); Dandan Tu, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 35 days.

(21) Appl. No.: 15/960,292

(22) Filed: Apr. 23, 2018

(65) Prior Publication Data
US 2018/0239549 A1    Aug. 23, 2018

Related U.S. Application Data

(63) Continuation of application No. PCT/CN2016/104234, filed on Nov. 1, 2016.

(30) Foreign Application Priority Data

Nov. 4, 2015   (CN) .......................... 201510741690.0

(51) Int. Cl.
*G06F 3/06* (2006.01)
*G06F 16/182* (2019.01)
(Continued)

(52) U.S. Cl.
CPC .......... *G06F 3/0619* (2013.01); *G06F 3/0613* (2013.01); *G06F 11/1076* (2013.01); (Continued)

(58) Field of Classification Search
CPC .... G06F 3/0619; G06F 16/1824; G06F 16/00; G06F 3/0613; G06F 3/0626; G06F 11/1076; G06F 16/13
See application file for complete search history.

(56) References Cited

U.S. PATENT DOCUMENTS

| 5,379,243 | A | * | 1/1995 | Greenberger | ........... G06F 7/726 708/492 |
| 6,043,946 | A | * | 3/2000 | Genheimer | ............ G11B 5/012 360/53 |

(Continued)

FOREIGN PATENT DOCUMENTS

| CN | 102411542 A | 4/2012 |
| CN | 103064902 A | 4/2013 |

(Continued)

OTHER PUBLICATIONS

Wunan et al.Research on Erasure Codes for Distributed Secure Storage System, CNKI. Oct. 2016.with partial English translation, total 167 pages.

(Continued)

*Primary Examiner* — Charles Rones
*Assistant Examiner* — Tong B. Vo
(74) *Attorney, Agent, or Firm* — Womble Bond Dickinson (US) LLP (57) ABSTRACT

An adaptive file storage method and apparatus is disclosed. The method includes determining a cold and hot attribute of a file, and performing coding storage processing or transcoding storage processing on the file according to the cold and hot attribute of the file. Therefore, a requirement of the cold and hot attribute of the file for storage overheads and restoration costs can be fully considered. In addition, the used coding technology has high reliability and a high coding speed. Therefore, comprehensive performance in multiple dimensions of storage overheads, restoration costs, reliability, and an coding speed can be improved.

17 Claims, 3 Drawing Sheets

(51) Int. Cl.
  *G06F 16/00* (2019.01)
  *G06F 11/10* (2006.01)
(52) U.S. Cl.
  CPC .......... *G06F 16/00* (2019.01); *G06F 16/1824* (2019.01); *G06F 3/0626* (2013.01)

(56) References Cited

U.S. PATENT DOCUMENTS

| | | | |
|---|---|---|---|
| 8,504,535 B1 * | 8/2013 | He | G06F 16/9574 707/695 |
| 10,152,601 B2 * | 12/2018 | Volvovski | G06F 16/21 |
| 2008/0082729 A1 | 4/2008 | Moon et al. | |
| 2012/0030242 A1 | 2/2012 | Nakamura | |
| 2013/0198583 A1 | 8/2013 | Bazhong et al. | |
| 2014/0129779 A1 * | 5/2014 | Frachtenberg | G06F 12/122 711/136 |
| 2016/0211869 A1 * | 7/2016 | Blaum | H03M 13/373 |
| 2016/0217823 A1 * | 7/2016 | Arslan | G06F 11/1008 |
| 2016/0371145 A1 * | 12/2016 | Akutsu | H04L 67/1097 |
| 2017/0264317 A1 * | 9/2017 | Datta | G06F 3/067 |

FOREIGN PATENT DOCUMENTS

| | | |
|---|---|---|
| CN | 103118133 A | 5/2013 |
| CN | 103605582 A | 2/2014 |
| CN | 103617007 A | 3/2014 |
| CN | 103645861 A | 3/2014 |
| CN | 103838860 A | 6/2014 |
| CN | 104281533 A | 1/2015 |
| WO | 2011111115 A1 | 9/2011 |

OTHER PUBLICATIONS

Luo Xianghong et al.: "Summary of Research for Erasure Code in Storage System", Jounal of computer research and development. 2012. total 11 pages. With English abstract.

* cited by examiner

ADAPTIVE FILE STORAGE METHOD AND APPARATUS

CROSS-REFERENCE TO RELATED APPLICATIONS

This application is a continuation of International Application No. PCT/CN2016/104234, filed on Nov. 1, 2016, which claims priority to Chinese Patent Application No. 201510741690.0, filed on Nov. 4, 2015. The disclosures of the aforementioned applications are hereby incorporated by reference in their entireties.

TECHNICAL FIELD

Embodiments of the present invention relate to the storage field, and more specifically, to an adaptive file storage method and apparatus.

BACKGROUND

In a distributed file system, to reduce storage overheads, data may be encoded and decoded by using an erasure code (EC) technology instead of a multi-copy replication solution. Each EC technology has an advantage, such as high reliability, low restoration costs, or low storage overheads. For example, according to a product code (PC) algorithm, an encoding mode in a horizontal direction and a vertical direction is used, and only an XOR algorithm is performed. Therefore, the product code algorithm has a high coding speed and low restoration costs, but has high storage overheads. A local reconstruction codes (LRC) algorithm has low storage overheads, but has high restoration costs when multiple nodes fail to work. Therefore, comprehensive performance of an existing EC technology needs to be further improved.

SUMMARY

Embodiments of the present invention provide an adaptive file storage method and apparatus, to improve comprehensive performance in multiple dimensions of storage overheads, restoration costs, reliability, and an coding speed.

A first aspect provides an adaptive file storage method. The method includes: determining a cold and hot attribute of the file, where the cold and hot attribute of the file represents frequency of accessing the file; and performing coding storage processing or transcoding storage processing on the file according to the cold and hot attribute of the file. According to the method, multiple EC technologies are adaptively used, so as to reduce storage overheads and restoration costs, and consider performance in all aspects as a whole.

With reference to the first aspect, in a first implementation manner of the first aspect, the determining a cold and hot attribute of the file includes: determining the cold and hot attribute of the file according to the access frequency of the file and/or an average access time interval of the file; and when the access frequency of the file is greater than a first frequency threshold, or the average access time interval of the file is less than a first time interval, determining that the cold and hot attribute of the file is hot; or when the access frequency of the file is not greater than a first frequency threshold, or the average access time interval of the file is not less than the first time interval, determining that the cold and hot attribute of the file is cold.

With reference to the first aspect or the first implementation manner of the first aspect, in a second implementation manner of the first aspect, the performing coding storage processing or transcoding storage processing on the file according to the cold and hot attribute of the file includes: when the cold and hot attribute of the file is hot, performing coding storage processing on the file by using a first coding algorithm; or when the cold and hot attribute of the file is cold, performing coding storage processing on the file by using a second coding algorithm, where restoration costs of the first coding algorithm are less than a restoration costs threshold, and storage overheads of the second coding algorithm are less than a storage overheads threshold.

With reference to the first aspect or the foregoing implementation manners of the first aspect, in a third implementation manner of the first aspect, the performing coding storage processing or transcoding storage processing on the file according to the cold and hot attribute of the file includes:

performing transcoding storage processing on the file according to a change of the cold and hot attribute of the file.

With reference to the first aspect or the foregoing implementation manners of the first aspect, in a fourth implementation manner of the first aspect, the performing the transcoding storage processing on the file according to a change of the cold and hot attribute of the file includes: when the cold and hot attribute of the file changes from cold to hot, performing, on the file, transcoding storage processing from a first source coding algorithm to a first destination coding algorithm; or when the cold and hot attribute of the file changes from hot to cold, performing, on the file, transcoding storage processing from a second source coding algorithm to a second destination coding algorithm, where restoration costs of the first destination coding algorithm are less than a restoration costs threshold, restoration costs of the first source coding algorithm are not less than the restoration costs threshold, storage overheads of the second destination coding algorithm are less than a storage overheads threshold, and storage overheads of the second source coding algorithm are not less than the storage overheads threshold. In this implementation manner, when a cold and hot attribute of data changes, an efficient incremental transcoding manner is used, and raw data is not recoded, so as to improve performance.

With reference to the first aspect or the foregoing implementation manners of the first aspect, in a fifth implementation manner of the first aspect, the performing, on the file, transcoding storage processing from a first source coding algorithm to a first destination coding algorithm includes: determining, as a first destination verification code, a result obtained by subtracting a first difference verification code from a first source verification code, where the file includes N data blocks, the first source verification code is generated by encoding the N data blocks based on a first encoding function, the first destination verification code is generated by encoding M data blocks in the N data blocks based on the first encoding function, the first difference verification code is generated by encoding data blocks other than the M data blocks in the N data blocks based on the first encoding function, the first encoding function is an encoding function based on the first source coding algorithm, N and M are positive integers, and N>M. In this implementation manner, when data is hot, a verification code previously generated by encoding cold data by using an EC technology is converted into a verification code of hot data EC technology. Raw data does not need to be recoded. An incremental encoding manner is used. Therefore, transcoding can be efficiently completed, and an excessive performance loss is avoided.

With reference to the first aspect or the foregoing implementation manners of the first aspect, in a sixth implementation manner of the first aspect, the performing, on the file, transcoding storage processing from a second source coding algorithm to a second destination coding algorithm includes: determining, as a second destination verification code, a result obtained by adding a second source verification code to a second difference verification code, where the file includes N data blocks, the second source verification code is generated by encoding M data blocks in the N data blocks based on a second encoding function, the second destination verification code is generated by encoding the N data blocks based on the second encoding function, the second difference verification code is generated by encoding data blocks other than the M data blocks in the N data blocks based on the second encoding function, the second encoding function is an encoding function based on the second source coding algorithm, N and M are positive integers, and N>M. In this implementation manner, when data is cold, a verification code previously generated by encoding hot data by using an EC technology is converted into a verification code of cold data EC technology. Raw data does not need to be recoded. An incremental encoding manner is used. Therefore, transcoding can be efficiently completed, and an excessive performance loss is avoided.

With reference to the first aspect or the foregoing implementation manners of the first aspect, in a seventh implementation manner of the first aspect, before the determining a cold and hot attribute of the file, the method further includes: determining that a storage time of the file reaches a first time threshold and a quantity of access times of the file is less than a first quantity threshold.

A second aspect provides an adaptive file storage apparatus. The apparatus includes all modules that perform the method in the first aspect.

A third aspect provides an adaptive file storage apparatus. The apparatus includes a memory and a processor connected to the memory. The memory is configured to store an instruction. The processor is configured to execute the instruction stored in the memory. When the processor executes the instruction stored in the memory, the processor is configured to perform the method in the first aspect. The steps of the method in the first aspect may be directly completed by the processor, or may be completed by using a combination of hardware and a software module in the processor. The software module may be located in a mature storage medium in the field, such as a random access memory, a flash memory, a read-only memory, a programmable read-only memory, an electrically-erasable programmable memory, or a register. The storage medium is located in the memory.

Therefore, based on the technical solution, according to the adaptive file storage method and apparatus in the embodiments of the present invention, storage processing can be performed on a file according to a cold and hot attribute of the file by using a corresponding coding technology. Therefore, a requirement of the cold and hot attribute of the file for storage overheads and restoration costs can be fully considered, so as to improve comprehensive performance in multiple dimensions of storage overheads, restoration costs, reliability, and an coding speed.

DESCRIPTION OF EMBODIMENTS

The following describes the technical solutions in embodiments of the present invention with reference to the accompanying drawings in the embodiments of the present invention.

The technical solutions in the embodiments of the present invention may be applied to a distributed file storage system, for example, a Hadoop distributed file system (HDFS), and a network file system (NFS).

Figure 1:
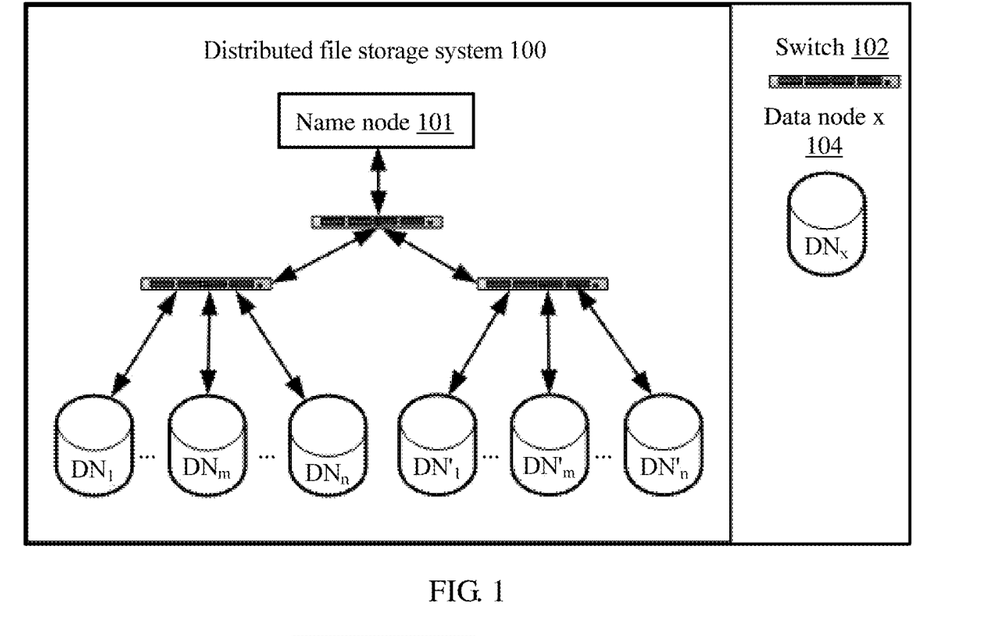
FIG. 1 is a schematic block diagram of a distributed file storage system according to an embodiment of the present invention.

Before an adaptive file storage method in the embodiments of the present invention is described, a physical structure of the distributed file storage system is first described. FIG. 1 shows a physical structure of a distributed file storage system 100. As shown in FIG. 1, the distributed file storage system 100 generally includes a name node (NameNode) 101 and a cluster of multiple data nodes (DataNode) 104. A quantity of data nodes 104 is not limited. The data nodes 104 are allocated to multiple racks. Data nodes 104 on a same rack are connected to each other by using a switch 102. The racks are also connected to each other by using a switch 102. The name node 101 manages metadata of the entire cluster. The data nodes 104 are responsible for locally persistent storage of file data. An erasure code (EC) is used to encode data and generate redundant data to ensure data reliability. By using the EC technology, the data is divided into multiple data blocks. The data blocks are distributed to DataNodes 104. In addition, verification codes obtained by means of encoding are stored in different locations, for example, a disk, a node, or another geographic location, so as to provide reliability or a redundancy capability. For example, when a file block of a node 4 is lost, data needs to be read from other five nodes, and the data needs to be returned to the node 4 for decoding, so as to restore data. This requires relatively high restoration costs. A typical HDFS uses an Reed-Solomon (RS) (10, 4), that is, 10 file blocks and four verification codes. In this case, data can be restored only after 10 pieces of data are transmitted on a network, and restoration costs are 10×. The EC is implemented by using multiple specific technologies, such as an Reed-Solomon (RS) code technology, a Cauchy Reed-Solomon (CRS) code technology, an local reconstruction codes (LRC) technology, and a HitchHiker technology.

Figure 2:
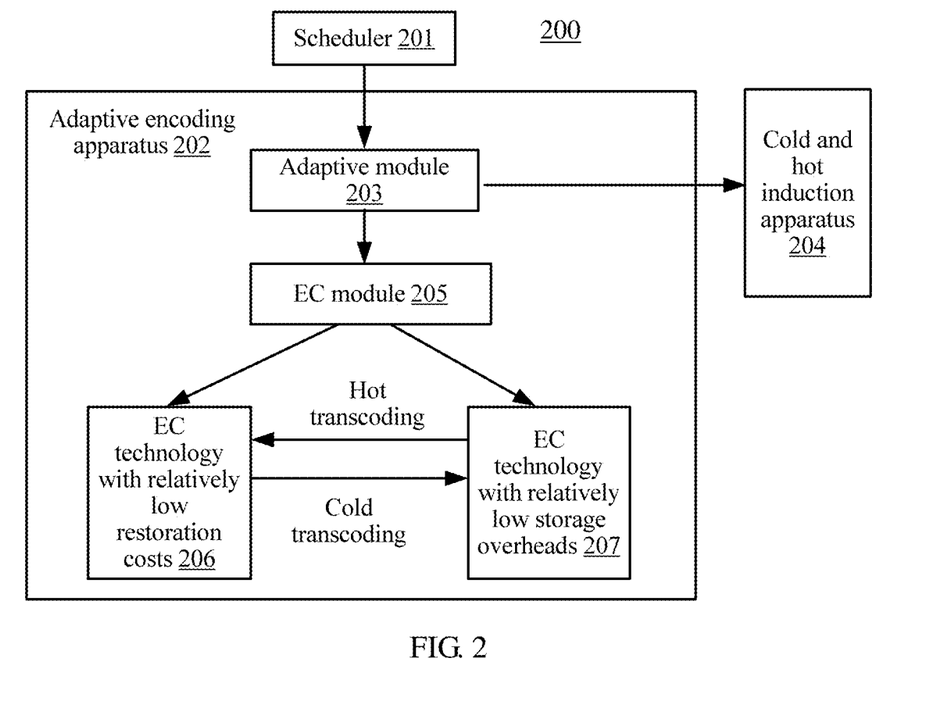
FIG. 2 is a diagram of a principle of an adaptive encoding apparatus according to an embodiment of the present invention.

As shown in FIG. 2, the distributed file storage system 200 in this embodiment of the present invention may further include a cold and hot induction apparatus 204 and an adaptive encoding apparatus 202. The cold and hot induction apparatus 204 is mainly configured to manage and maintain a cold and hot degree of data. In an embodiment, a warm queue (elimination is performed according to a least recently used (LRU) rule) and a hot queue (elimination is performed according to a first in, first out (FIFO) rule) may be used to manage and maintain relatively hot data. A migration of a queue element is triggered only when a quantity of file access times reaches a preset threshold (for example, five times), so as to avoid a frequent migration of the queue. Data that is not in the warm queue or the hot queue is considered as cold data. In another embodiment, a separate cold queue may be used to maintain and manage the cold data. For example, when the quantity of file access times is less than a preset threshold, the data is added to the cold queue.

A scheduler 201 is mainly configured to schedule an coding task. For example, based on a request from a client, a file or a file block is scheduled for encoding.

An adaptive module 203 and an EC module 205 encode and decode, according to a result that is output by the cold and hot induction apparatus 204, data with different cold and hot degrees by using different EC technologies. For relatively hot data, an EC encoding technology with relatively low restoration costs 206 is used, so as to rapidly restore data. For relatively cold data, an EC technology with relatively low storage overheads 207 is used, for example, an RS code technology. For example, for data in the hot queue and/or the warm queue, an EC encoding technology with relatively low restoration costs 206 is used. For relatively cold data that is not in the warm queue or the hot queue, an RS code technology is used, and the technology has low storage overheads 207. It may be understood that the adaptive module and the EC module 205 may be combined to one module, so as to implement an adaptive EC encoding function according to a cold and hot degree of data.

Further, as shown in FIG. 2, when data is cold, cold transcoding is performed on an encoding result of a verification code node; or when data is hot, hot transcoding is performed on an encoding result of a verification code node. Transcoding is performed in an incremental encoding manner. In addition, only half of verification codes need to be transcoded, thereby avoiding a performance problem caused due to recoding all the verification codes. For specific implementation details of the cold transcoding and the hot transcoding, refer to FIG. 4 and a related embodiment.

In an embodiment, the cold and hot induction apparatus and the adaptive encoding apparatus 202 may be integrated in an adaptive file storage apparatus. The adaptive file storage apparatus may be integrated in a name node, or may be an independent apparatus in the distributed file storage system. This is not limited in this embodiment of the present invention. It may be understood that the adaptive file storage apparatus may be implemented by using a proper combination of software, hardware, and/or firmware. Some implementation manners are described in subsequent embodiments of the present invention.

Figure 3:
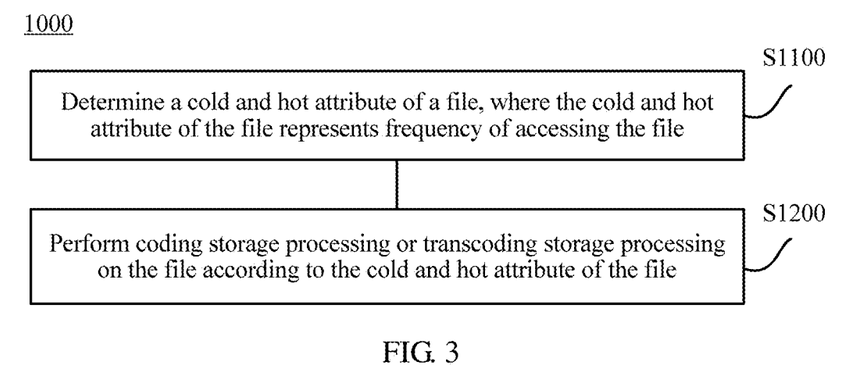
FIG. 3 is a schematic flowchart of an adaptive file storage method according to an embodiment of the present invention.

FIG. 3 shows a schematic flowchart of an adaptive file storage method 1000 according to an embodiment of the present invention. The method 1000 may be performed by the adaptive file storage apparatus. The method 1000 includes:

S1100. Determine a cold and hot attribute of the file, where the cold and hot attribute of the file represents frequency of accessing the file.

S1200. Perform coding storage processing or transcoding storage processing on the file according to the cold and hot attribute of the file.

Specifically, the adaptive file storage apparatus may be configured to determine a cold and hot attribute of the current file. The cold and hot attribute of the file represents frequency of accessing the file. Optionally, the adaptive file storage apparatus may determine the cold and hot attribute of the file according to the access frequency of the file. For example, when the access frequency of the file is greater than 10 times per week, it may be determined that the cold and hot attribute of the file is hot. The adaptive file storage apparatus may further determine the cold and hot attribute of the file according to an average access time interval of the file. For example, in a time period such as one month or two months, if an average access time interval of two times of consecutive file access is less than 16.8 hours, the adaptive file storage apparatus may determine that the cold and hot attribute of the file is hot. After the adaptive file storage apparatus determines the cold and hot attribute of the file, the adaptive file storage apparatus may perform encoding storage or transcoding storage processing on the file according to the cold and hot attribute of the file. Optionally, when a current cold and hot attribute of the file is hot, the adaptive file storage apparatus may perform storage processing on the file by using an coding technology with low restoration costs, for example, a PC(2×5) technology or an EvenOdd code technology may be used. Optionally, when a current cold and hot attribute of the file is cold, the adaptive file storage apparatus may perform storage processing on the file by using an coding technology with low storage overheads, for example, by using a PC(6×5) coding technology, a HoVer code coding technology, or an LRC technology. Optionally, if it is determined that the cold and hot attribute of the file changes from cold to hot, the adaptive file storage apparatus may further perform storage by using an coding technology with lower restoration costs instead of an coding technology currently applied to the file. If it is determined that the cold and hot attribute of the file changes from hot to cold, the adaptive file storage apparatus may further perform storage by using an coding technology with lower storage overheads instead of an coding technology currently applied to the file.

Therefore, according to the adaptive file storage method in this embodiment of the present invention, storage processing can be performed on a file according to a cold and hot attribute of the file by using a corresponding coding technology. A requirement of the cold and hot attribute of the file for storage overheads and restoration costs can be fully considered. In addition, the used coding technology has high reliability and a high coding speed. Therefore, according to the adaptive file storage method in this embodiment of the present invention, performance in multiple dimensions of storage overheads, restoration costs, reliability, and an coding speed can be all considered.

It should be understood that, in this embodiment of the present invention, the encoding storage may mean that storage processing is performed on the file by using one coding algorithm. In a distributed file storage system, the file is divided into pieces of file block data that are separately stored in multiple data nodes. The performing coding storage processing on the file may mean that a linear iterative computation is performed on the pieces of file block data included in the file, to obtain a verification code of the file. Then, the verification code of the file is stored in a new data node, that is, file block data and verification code data are not stored in a same node. The transcoding storage means that an coding algorithm currently used for storing the file is changed to another coding algorithm, or may mean that a verification code of an coding algorithm used for storing the file is converted to a verification code of another coding algorithm. For example, an coding algorithm currently used for storing the file is an A algorithm, and a corresponding verification code is an A verification code. By performing the transcoding storage processing on the file, the A algorithm used for storing the file is changed to a B algorithm. The file may be recorded by using the B algorithm to generate a B verification code corresponding to the B algorithm. Optionally, the A verification code corresponding to the A algorithm may further be converted to the B verification code corresponding to the B algorithm.

Optionally, in this embodiment of the present invention, the determining a cold and hot attribute of the file includes:

determining the cold and hot attribute of the file according to the access frequency of the file and/or an average access time interval of the file; and when the access frequency of the file is greater than a first frequency threshold, or the average access time interval of the file is less than a first time interval, determining that the cold and hot attribute of the file is hot; or when the access frequency of the file is not greater than a first frequency threshold, or the average access time interval of the file is not less than a first time interval, determining that the cold and hot attribute of the file is cold.

Specifically, the adaptive file storage apparatus may be configured to determine the cold and hot attribute of the file. The adaptive file storage apparatus may determine the cold and hot attribute of the file according to the access frequency of the file and/or the average access time interval of the file. Optionally, the adaptive file storage apparatus may periodically perform detection on a status of the file. For example, the adaptive file storage apparatus may perform detection on the status of the file once a week, and may record a quantity of file access times and/or a time interval between latest two times of file access in the week. Optionally, when the file is stored in the distributed file system, the adaptive file storage apparatus may start to perform an operation of periodically performing detection on the status of the file. For example, if a storage time of the file is eight weeks, and a detection period in which the adaptive file storage apparatus performs detection on the status of the file is one week, in a storage period of the eight weeks, the adaptive file storage apparatus performs detection on the status of the file for eight times, and records eight groups of access data of the file. Optionally, the adaptive file storage apparatus may determine the access frequency of the file according to data that is of a quantity of access times in each week and that is of the eight groups of recorded access data. Likewise, the adaptive file storage apparatus may determine the average access time interval of the file according to a time interval between latest two times of file access and that is of the eight groups of recorded access data. Optionally, the adaptive file storage apparatus may further determine the access frequency or the average access time interval of the file according to data of a quantity of file access times in a specified time period (for example, one month or two months) or data of a time interval between latest two times of file access. Optionally, when the access frequency of the file is greater than the first frequency threshold, or the average access time interval of the file is less than the first time interval, it is determined that the cold and hot attribute of the file is hot; or when the access frequency of the file is not greater than a first frequency threshold, or the average access time interval of the file is not less than the first time interval, it is determined that the cold and hot attribute of the file is cold. For example, the first frequency threshold is 10 times per week. If the access frequency of the file is greater than 10 times per week, it may be determined that the cold and hot attribute of the file is hot; or if the access frequency of the file is not greater than 10 times per week, the cold and hot attribute of the file is cold. Alternatively, the first time interval is once per 0.7 days. If the average access time interval of the file is less than once per 0.7 days, it may be determined that the cold and hot attribute of the file is hot; or if the average access time interval of the file is not less than once per 0.7 weeks, the cold and hot attribute of the file is cold.

It may be understood that the first frequency threshold and the first time interval are not uniquely determined. The first frequency threshold and the first time interval may be determined according to an access quantity of the distributed file storage system and/or a storage capacity of the system. Optionally, when the distributed file system has a relatively large access quantity, a relatively large first frequency threshold may be set; or when the system has a relatively large storage capacity, a relatively large first time interval may be set. The first frequency threshold and the first time interval may also be determined according to another factor, for example, a type of the file. This is not limited in this embodiment of the present invention.

It should be understood that, in this embodiment of the present invention, an example in which the first frequency threshold is 10 times per week and the first time interval is once per 0.7 days is merely an example for description, and should not constitute any limitation on this embodiment of the present invention. In this embodiment of the present invention, the first frequency threshold may further be eight times per week, and the first time interval may be once a day, and the like.

Optionally, in this embodiment of the present invention, the performing coding storage or transcoding storage processing on the file according to the cold and hot attribute of the file includes:

when the cold and hot attribute of the file is hot, performing coding storage processing on the file by using a first coding algorithm; or when the cold and hot attribute of the file is cold, performing coding storage processing on the file by using a second coding algorithm.

Restoration costs of the first coding algorithm are less than a restoration costs threshold, and storage overheads of the second coding algorithm are less than a storage overheads threshold.

Specifically, in this embodiment of the present invention, an original storage manner of the file may be a multi-copy storage manner. The multi-copy storage manner has relatively large storage overheads. For example, if an original storage manner of the file is a three-copy storage manner, storage overheads of the file are three times of a size of the file. In this case, the file may be stored by using an EC coding technology instead. In comparison with a multi-copy technology, the EC coding technology has higher reliability and a higher coding speed. Optionally, the adaptive file storage apparatus may choose, according to the cold and hot attribute of the file, to use an EC coding technology with low restoration costs or an coding technology with low storage overheads. Optionally, before the adaptive file storage apparatus stores the file by using the EC coding technology, the adaptive file storage apparatus first determines the cold and hot attribute of the file. The adaptive file storage apparatus may determine the cold and hot attribute of the file according to the access frequency of the file and/or the average access time interval of the file. Then, the adaptive file storage apparatus may perform storage according to the cold and hot attribute of the file by using a corresponding EC coding technology. Optionally, when the adaptive file storage apparatus determines that the cold and hot attribute of the file is hot, the adaptive file storage apparatus stores the file by using the first coding algorithm; or when the adaptive file storage apparatus determines that the cold and hot attribute of the file is cold, the adaptive file storage apparatus stores the file by using the second coding algorithm. The restoration costs of the first coding algorithm are less than the restoration costs threshold, and the storage overheads of the second coding algorithm are less than the storage overheads threshold. For example, the first coding algorithm may be a PC(2×5) technology, an EvenOdd code technology, or the like, and the second coding algorithm may be a PC(6×5) technology, an LRC technology, or the like. After performing storage processing on the file according to the cold and hot attribute of the file by using a corresponding EC coding technology, the adaptive file storage apparatus deletes data stored in a multi-copy manner. In this way, space occupied by data stored in the multi-copy manner is released, thereby reducing storage overheads.

It should be understood that the restoration costs threshold and the storage overheads threshold may be set by a system, or may be set by a user according to a current requirement. This is not limited in this embodiment of the present invention.

Therefore, according to the adaptive file storage method in this embodiment of the present invention, storage processing can be performed on a file according to a cold and hot attribute of the file by using a corresponding coding technology. A requirement of the cold and hot attribute of the file for storage overheads and restoration costs can be fully considered. In addition, the used coding technology has high reliability and a high coding speed. Therefore, according to the adaptive file storage method in this embodiment of the present invention, comprehensive performance in multiple dimensions of storage overheads, restoration costs, reliability, and an coding speed can be improved.

Optionally, in this embodiment of the present invention, before the determining a cold and hot attribute of the file, the method 1000 further includes:

determining that a storage time of the file reaches a first time threshold and a quantity of access times of the file is less than a first quantity threshold.

Specifically, when the original storage manner of the file is the multi-copy storage manner, optionally, before the cold and hot attribute of the file is determined, it is first determined that the storage time of the file reaches the first time threshold and the quantity of file access times is less than the first threshold. That is, the file is not frequently accessed in this storage time period. If a file that is not frequently accessed is stored in a file system in the multi-copy manner, much storage space is wasted. Therefore, occupied storage space is reduced if the file is stored by using an coding technology instead. Before the file is stored by using the coding technology instead, the cold and hot attribute of the file may be first determined, and then it is determined, according to the cold and hot attribute of the file, that an coding technology with low restoration costs or an coding technology with low storage overheads is used.

Optionally, in this embodiment of the present invention, the performing coding storage or transcoding storage processing on the file according to the cold and hot attribute of the file includes:

performing transcoding storage processing on the file according to a change of the cold and hot attribute of the file.

That is, the adaptive file storage apparatus may determine to perform transcoding storage processing on the file according to the change of the cold and hot attribute of the file. Optionally, when the cold and hot attribute of the file changes from cold to hot or from hot to cold, the adaptive file storage apparatus may change an coding algorithm for storing the file to another coding algorithm.

Optionally, in this embodiment of the present invention, the performing transcoding storage processing on the file according to a change of the cold and hot attribute of the file includes:

when the cold and hot attribute of the file changes from cold to hot, performing, on the file, transcoding storage processing from a first source coding algorithm to a first destination coding algorithm; or when the cold and hot attribute of the file changes from hot to cold, performing, on the file, transcoding storage processing from a second source coding algorithm to a second destination coding algorithm.

Restoration costs of the first destination coding algorithm are less than a restoration costs threshold, restoration costs of the first source coding algorithm are not less than the restoration costs threshold, storage overheads of the second destination coding algorithm are less than a storage overheads threshold, and storage overheads of the second source coding algorithm are not less than the storage overheads threshold.

Specifically, in this embodiment of the present invention, a storage technology used for storing the file is an EC coding technology. Performance in multiple dimensions cannot be all considered by using the EC coding technology. In addition, files with different cold and hot attributes require different performance in restoration costs, storage overheads, or the like. Optionally, when the adaptive file storage apparatus determines that the cold and hot attribute of the file changes, for example, the adaptive file storage apparatus determines that the cold and hot attribute of the file changes from cold to hot, or the cold and hot attribute of the file changes from hot to cold, in this case, it may mean that performance that is required by the file for a used coding technology changes. When the cold and hot attribute of the file changes from cold to hot, the file requires higher restoration costs and lower storage overheads for a used coding technology; or when the cold and hot attribute of the file changes from hot to cold, the file requires higher storage overheads and lower restoration costs for a used coding technology. Optionally, when the cold and hot attribute of the file changes, the adaptive file storage apparatus performs transcoding storage processing on the file according to the cold and hot attribute of the file. That is, the adaptive file storage apparatus changes, according to the change of the cold and hot attribute of the file, an EC coding technology currently used to store the file to an EC coding technology matching a requirement for a current cold and hot attribute of the file. Optionally, when the adaptive file storage apparatus determines that the cold and hot attribute of the file changes from cold to hot, the adaptive file storage apparatus performs, on the file, transcoding storage from the first source coding algorithm to the first destination coding algorithm. The restoration costs of the first destination coding algorithm are less than the restoration costs threshold, and the restoration costs of the first source coding algorithm are not less than the restoration costs threshold. In comparison with storing a file whose cold and hot attribute is cold, storing a file whose cold and hot attribute is hot has a higher requirement for restoration costs. That is, restoration costs required for storing a file whose cold and hot attribute is hot are less than restoration costs required for storing a file whose cold and hot attribute is cold. Therefore, when a cold and hot attribute of a file changes, an EC coding technology used for storing the file needs to be correspondingly adjusted according to a change of the cold and hot attribute of the file. That is, when the cold and hot attribute of the file changes from cold to hot, performance of restoration costs in an EC coding technology previously used to store the file may not necessarily meet a requirement for a current cold and hot attribute. Therefore, if the previous EC coding technology with relatively high restoration costs is still used for storage, total restoration costs of the file increase. Optionally, when the cold and hot attribute of the file changes from cold to hot, the previously used coding technology with relatively high restoration costs is changed to an coding technology with relatively low restoration costs. For example, a Reed Solomon (Reed Solomon, RS) code coding technology may be changed to a Mix-Reed Solomon (Mix-RS) code coding technology. Restoration costs of the Mix-RS code are less than restoration costs of the RS code. Likewise, when the cold and hot attribute of the file changes from hot to cold, the adaptive file storage apparatus performs, on the file, transcoding storage from the second source coding algorithm to the second destination coding algorithm. The storage overheads of the second destination coding algorithm are less than the storage overhead threshold, and the storage overheads of the second source coding algorithm are not less than the storage overheads threshold. In comparison with storing a file whose cold and hot attribute is hot, storing a file whose cold and hot attribute is cold has a higher requirement for storage overheads. That is, storage overheads required for storing a file whose cold and hot attribute is cold is less than storage overheads required for storing a file whose cold and hot attribute is hot. Therefore, when a cold and hot attribute of a file changes, an EC coding technology used for storing the file needs to be correspondingly adjusted according to the cold and hot attribute of the file. Optionally, when the cold and hot attribute of the file changes from hot to cold, a previously used coding technology with relatively high storage overheads is changed to an coding technology with relatively low storage overheads. For example, an coding technology used to store the file may be changed from the Mix-RS code coding technology to the RS code coding technology. Storage overheads of the RS code are less than storage overheads of the Mix-RS code. Optionally, the adaptive file storage apparatus may recode raw data of the file to generate a verification code in a new coding technology. The adaptive file storage apparatus may also generate a verification code in a new coding technology in an incremental manner. For example, a verification code of the first source coding algorithm is changed to a verification code of the first destination coding algorithm. The adaptive file storage apparatus performs transcoding in the incremental manner, so as to avoid a performance loss caused due to recoding the raw data of the file. Therefore, according to the adaptive file storage method in this embodiment of the present invention, transcoding storage processing can be performed on a file according to a cold and hot attribute of the file by using a corresponding coding technology. A requirement of the cold and hot attribute of the file for storage overheads and restoration costs can be fully considered. In addition, the used coding technology has high reliability and a high coding speed. Therefore, according to the adaptive file storage method in this embodiment of the present invention, comprehensive performance in multiple dimensions of storage overheads, restoration costs, reliability, and an coding speed can be improved.

Optionally, in this embodiment of the present invention, the performing, on the file, transcoding storage processing from a first source coding algorithm to a first destination coding algorithm includes:

determining, as a first destination verification code, a result obtained by subtracting a first difference verification code from a first source verification code.

The file includes N data blocks. The first source verification code is generated by encoding the N data blocks based on a first encoding function. The first destination verification code is generated by encoding M data blocks in the N data blocks based on the first encoding function. The first difference verification code is generated by encoding data blocks other than the M data blocks in the N data blocks based on the first encoding function. The first encoding function is an encoding function based on the first source coding algorithm, N and M are positive integers, and N>M.

Specifically, when the cold and hot attribute of the file changes from cold to hot, transcoding from the first source coding algorithm to the first destination coding algorithm may be performed on the file. That is, a verification code of the first source coding algorithm may be converted to a verification code of the first destination coding algorithm. Optionally, in this case, the verification code of the first source coding algorithm may be converted to the verification code of the first destination coding algorithm in an incremental transcoding manner. For example, the file includes the N data blocks. The first source verification code is generated by encoding the N data blocks based on the first encoding function in a first coding algorithm. The first source verification code is converted to the first destination verification code. The N data blocks do not need to be recoded, and only the first difference verification code needs to be obtained from the first source verification code. If the first destination verification code is generated by encoding the M data blocks in the N data blocks, a corresponding verification code of encoding the data blocks other than the M data blocks in the N data blocks is obtained from the first source verification code. The verification code serves as the first difference verification code. Then the result obtained by subtracting the first difference verification code from the first source verification code is determined as the first destination verification code.

The performing, on the file, transcoding storage processing from a second source coding algorithm to a second destination coding algorithm includes:

determining, as a second destination verification code, a result obtained by adding a second source verification code to a second difference verification code.

The file includes N data blocks. The second source verification code is generated by encoding M data blocks in the N data blocks based on a second encoding function. The second destination verification code is generated by encoding the N data blocks based on the second encoding function. The second difference verification code is generated by encoding data blocks other than the M data blocks in the N data blocks based on the second encoding function. The second encoding function is an encoding function based on the second source coding algorithm, N and M are positive integers, and N>M.

Specifically, when the cold and hot attribute of the file changes from hot to cold, transcoding from the second source coding algorithm to the second destination coding algorithm may be performed on the file. That is, a verification code of the second source coding algorithm may be converted to a verification code of the second destination coding algorithm. Optionally, in this case, the verification code of the second source coding algorithm may be converted to the verification code of the second destination coding algorithm in an incremental transcoding manner. For example, the file includes the N data blocks. The second source verification code is generated by encoding the M data blocks in the N data blocks based on the second encoding function in the second coding algorithm. The second source verification code is converted to the second destination verification code. The N data blocks do not need to be recoded, and only the second difference verification code needs to be obtained from the second source verification code. If the second destination verification code is generated by encoding the N data blocks, a corresponding verification code of encoding the data blocks other than the M data blocks in the N data blocks is obtained from the second source verification code. The verification code serves as the second difference verification code, and then the result obtained by adding the second source verification code to the second difference verification code is determined as the second destination verification code.

Figure 4:
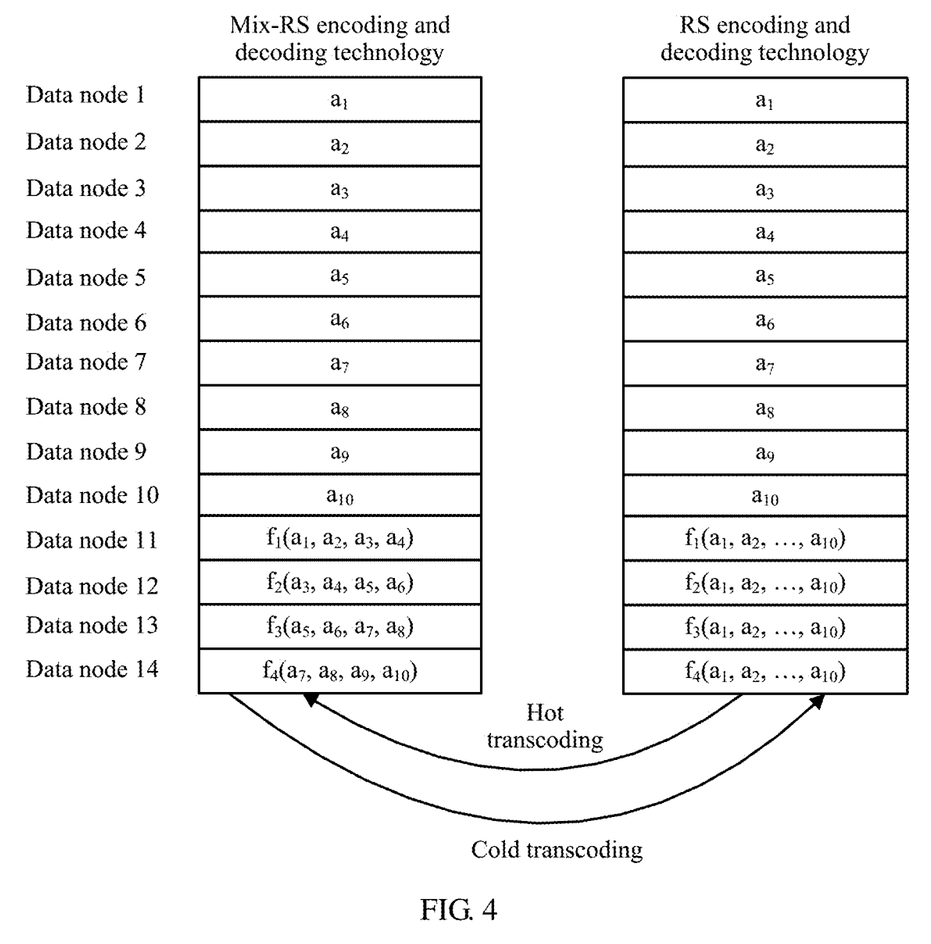
FIG. 4 is a schematic diagram of a file transcoding storage method according to an embodiment of the present invention.

The following describes how to perform transcoding between two coding technologies in an incremental transcoding manner with reference to FIG. 4. It should be understood that, in this embodiment of the present invention, mutual conversion between a verification code of a Mix-RS code technology and that of an RS code technology is merely an example for description, and should not constitute any limitation on this embodiment of the present invention. A method for performing transcoding in an incremental manner in this embodiment of the present invention may also be applied to mutual conversion between a verification code of a PC(6×5) and that of a PC(2×5), and the like.

In FIG. 4, for example, this file includes 10 data blocks ($a_1$ to $a_{10}$). The 10 data blocks are respectively stored in 10 data nodes (a data node 1 to a data node 10). Optionally, if the file is stored by using the RS code technology, verification codes for performing coding by using the RS code technology may include four verification codes ($f_1(a_1, a_2, \ldots, a_{10})$, $f_2(a_1, a_2, \ldots, a_{10})$, $f_3(a_1, a_2, \ldots, a_{10})$, and $f_4(a_1, a_2, \ldots, a_{10})$) that are respectively located in four data nodes (a data node 11 to a data node 14). The verification code $f_1(a_1, a_2, a_{10})$ is generated by encoding $a_1$ to $a_{10}$ of the file by using an $f_1$ encoding function. The verification code $f_2(a_1, a_2, \ldots, a_{10})$ is generated by encoding $a_1$ to $a_{10}$ of the file by using an $f_2$ encoding function. The verification code $f_3(a_1, a_2, \ldots, a_{10})$ is generated by encoding $a_1$ to $a_{10}$ of the file by using an $f_3$ encoding function. The verification code $f_4(a_1, a_2, \ldots, a_{10})$ is generated by encoding $a_1$ to $a_{10}$ of the file by using an $f_4$ encoding function. Optionally, when a cold and hot attribute of the file changes from cold to hot, a verification code of the RS Code technology may be converted, in the incremental transcoding manner, to a verification code of the Mix-RS code technology. That is, hot transcoding needs to be performed on a verification code of the file. Verification codes of the Mix-RS code technology may also include four verification codes ($f_1(a_1, a_2, a_3, a_4)$, $f_2(a_3, a_4, a_5, a_6)$, $f_3(a_5, a_6, a_7, a_8)$, and $f_4(a_7, a_8, a_9, a_{10})$) that are respectively located in the four data nodes (the data node 11 to the data node 14). The verification code $f_1(a_1, a_2, a_3, a_4)$ may be generated by performing encoding on some pieces of data of $a_1$ to $a_4$ of the file by using the $f_1$ encoding function. Optionally, the $f_1(a_1, a_2, a_3, a_4)$ may be obtained by subtracting an encoding result obtained by performing encoding on six remaining data nodes ($a_5$ to $a_{10}$) by using the same encoding function $f_1$ from a verification code of a corresponding part in an RS code, that is, the $f_1(a^1, a_2, \ldots, a_{10})$. A verification code of another part may also be obtained by using the same method. That is, the verification codes of the Mix-RS code technology may be obtained according to the following relations:

$$f_1(a_1,a_2,a_3,a_4)=f_1(a_1,a_2,\ldots,a_{10})-f_1(a_5,a_6,\ldots,a_{10}),$$

$$f_2(a_1,a_2,a_3,a_4)=f_2(a_1,a_2,\ldots,a_{10})-f_2(a_5,a_6,\ldots,a_{10}),$$

$$f_3(a_1,a_2,a_3,a_4)=f_3(a_1,a_2,\ldots,a_{10})-f_3(a_5,a_6,\ldots,a_{10}); \text{ and}$$

$$f_4(a_1,a_2,a_3,a_4)=f_4(a_1,a_2,\ldots,a_{10})-f_4(a_5,a_6,\ldots,a_{10}).$$

In this way, there is no need to read a corresponding data block from each data node of the file, recode the data blocks, and generate a corresponding verification code. Only a verification code of a corresponding data block needs to be obtained from existing verification codes of the file, and then a required verification code may be obtained by performing subtraction. For example, $f_1(a_1, a_2, \ldots, a_{10})$ is known. If $f_1(a_1, a_2, a_3, a_4)$ needs to be obtained, $f_1(a_5, a_6, \ldots, a_{10})$ is first obtained from $f_1(a_1, a_2, \ldots, a_{10})$, and then $f_1(a_1, a_2, a_3, a_4)$ is obtained by subtracting $f_1(a_5, a_6, \ldots, a_{10})$ from $f_1(a_5, a_6, \ldots, a_{10})$.

Likewise, when the cold and hot attribute of the file changes from hot to cold, a verification code of the Mix-RS code technology may be converted to a verification code of the RS code technology in the incremental transcoding manner. That is, cold transcoding needs to be performed on a verification code of the file. Optionally, the verification code of the RS code technology may be obtained by adding the verification code of the Mix-RS code technology to an encoding result obtained by encoding six remaining data nodes by using the same encoding function. That is, verification codes of the RS code may be obtained according to the following relations:

$$f_1(a_1,a_2,\Lambda,a_{10})=f_1(a_1,a_2,a_3,a_4)+f_1(a_5,a_6,\Lambda,a_{10});$$

$$f_2(a_1,a_2,\Lambda,a_{10})=f_2(a_1,a_2,a_3,a_4)+f_2(a_5,a_6,\Lambda,a_{10});$$

$$f_3(a_1,a_2,\Lambda,a_{10})=f_3(a_1,a_2,a_3,a_4)+f_3(a_5,a_6,\Lambda,a_{10}); \text{ and}$$

$$f_4(a_1,a_2,\Lambda,a_{10})=f_4(a_1,a_2,a_3,a_4)+f_4(a_5,a_6,\Lambda,a_{10}).$$

Therefore, the incremental transcoding manner is used to transcode a verification code of the file, so as to avoid system consumption caused due to recoding raw data.

It should be understood that, in this embodiment of the present invention, that the file is stored in 10 data nodes, and verification codes of the file are stored in four data nodes is merely used as an example for description, and should not constitute any limitation on this embodiment of the present invention. This embodiment of the present invention is not limited thereto. In this embodiment of the present invention, the file may be further stored in 15 data nodes, and the verification codes of the file may be stored in six data nodes, and the like. This is not limited in this embodiment of the present invention. It should be further understood that, in this embodiment of the present invention, four data blocks or 10 data blocks of the file used for encoding to generate a verification code are merely used for description, and should not constitute any limitation on this embodiment of the present invention. In this embodiment of the present invention, six data blocks or eight data blocks of the file may be further used for encoding to generate a corresponding verification code, and the like.

Table 1 shows an improvement proportion in storage overheads, restoration costs, and reliability performance of an adaptive file storage method in this embodiment of the present invention to several existing distributed file systems: a Facebook HDFS system, a Window Azure system, and a Google Colossus file system.

TABLE 1

| | Storage overheads | Restoration costs | Reliability |
|---|---|---|---|
| Facebook HDFS system | 6.7% | 64% | 0.0% |
| Window Azure system | −0.4% | 40% | 25% |
| Google Colossus file system | 0% | 40% | 25% |

It may be learned from the data that comprehensive performance in multiple dimensions of storage overheads, restoration costs, reliability, and an coding speed can be improved according to the adaptive file storage method in this embodiment of the present invention.

Therefore, according to the adaptive file storage method in this embodiment of the present invention, transcoding storage processing can be performed on a file according to a cold and hot attribute of the file by using a corresponding coding technology. A requirement of the cold and hot attribute of the file for storage overheads and restoration costs can be fully considered. In addition, the used coding technology has high reliability and a high coding speed. Therefore, according to the adaptive file storage method in this embodiment of the present invention, comprehensive performance in multiple dimensions of storage overheads, restoration costs, reliability, and an coding speed can be improved.

The foregoing describes an adaptive file storage method in detail according to an embodiment of the present invention with reference to FIG. 3 and FIG. 4. The following describes an adaptive file storage apparatus in detail according to an embodiment of the present invention with reference to FIG. 5.

Figure 5:
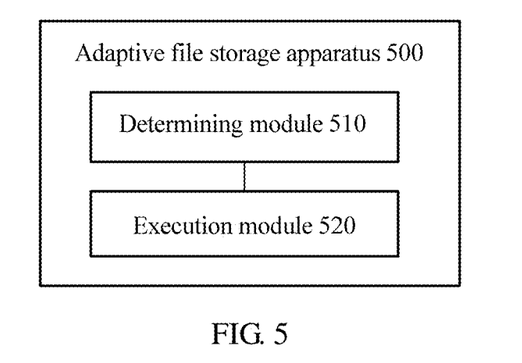
FIG. 5 is a schematic block diagram of an adaptive file storage apparatus according to an embodiment of the present invention.

FIG. 5 shows a schematic block diagram of an adaptive file storage apparatus 500 according to an embodiment of the present invention. As shown in FIG. 5, the adaptive file storage apparatus 500 includes a determining module 510 and an execution module 520.

The determining module 510 is configured to determine a cold and hot attribute of a file. The cold and hot attribute of the file represents frequency of accessing the file.

The execution module 520 is configured to perform coding storage processing or transcoding storage processing on the file according to the cold and hot attribute of the file determined by the determining module 510.

Specifically, the determining module 510 determines the cold and hot attribute of the file. Optionally, the determining module 510 may determine the cold and hot attribute of the file according to the access frequency of the file. For example, when the access frequency of the file is greater than 10 times per week, the determining module 510 may determine that the cold and hot attribute of the file is hot. The determining module 510 may further determine the cold and hot attribute of the file according to an average access time interval of the file. For example, if an average access time interval of two times of consecutive file access is less than 16.8 hours, the determining module 510 may determine that the cold and hot attribute of the file is hot. When the determining module 510 determines that the cold and hot attribute of the file is cold or hot, the execution module 520 may perform coding storage processing or transcoding storage processing on the file according to the cold and hot attribute of the file.

Therefore, according to the adaptive file storage apparatus in this embodiment of the present invention, storage processing can be performed on a file according to a cold and hot attribute of the file by using a corresponding coding technology. A requirement of the cold and hot attribute of the file for storage overheads and restoration costs can be fully considered. In addition, the used coding technology has high reliability and a high coding speed. Therefore, according to the adaptive file storage apparatus in this embodiment of the present invention, comprehensive performance in multiple dimensions of storage overheads, restoration costs, reliability, and an coding speed can be improved.

Optionally, in this embodiment of the present invention, the determining module 510 is configured to:

determine the cold and hot attribute of the file according to the access frequency of the file and/or an average access time interval of the file; and when the access frequency of the file is greater than a first frequency threshold, or the average access time interval of the file is less than a first time interval, determine that the cold and hot attribute of the file is hot; or when the access frequency of the file is not greater than a first frequency threshold, or the average access time interval of the file is not less than a first time interval, determine that the cold and hot attribute of the file is cold.

Specifically, the determining module 510 has a same function as the cold and hot induction apparatus in FIG. 2. The determining module 510 may be implemented by using a software program, for example, may be implemented by using the software program in a process; may be implemented by using a software module on a hardware chip; or may be implemented by using a combination of hardware and a software module. In this distributed file storage system, there may be one or more determining modules configured to determine a cold and hot attribute of a file stored in the system. When there is one determining module, the determining module is configured to determine cold and hot attributes of all files in the distributed file storage system. In this case, optionally, the determining module may be integrated into a name node, or may be an independent module in the distributed file storage system. This is not limited in this embodiment of the present invention. When there are multiple determining modules, optionally, a determining module may be disposed on each rack, or a determining module may be disposed on each data node, and the like. This is not limited in this embodiment of the present invention. Optionally, in this embodiment of the present invention, the execution module 520 is configured to:

when the determining module 510 determines that the cold and hot attribute of the file is hot, perform coding storage processing on the file by using a first coding algorithm; or when the determining module 510 determines that the cold and hot attribute of the file is cold, perform coding storage processing on the file by using a second coding algorithm.

Restoration costs of the first coding algorithm are less than a restoration costs threshold, and storage overheads of the second coding algorithm are less than a storage overheads threshold.

Optionally, in this embodiment of the present invention, the apparatus 500 may further include a judging module.

The judging module is configured to determine that a storage time of the file reaches a first time threshold and a quantity of access times of the file is less than a first quantity threshold. The judging module may be integrated into the determining module 510.

Optionally, in this embodiment of the present invention, the execution module 520 is configured to:

when the determining module 510 determines that the cold and hot attribute of the file changes from cold to hot, perform, on the file, transcoding storage processing from a first source coding algorithm to a first destination coding algorithm; or when the determining module 510 determines that the cold and hot attribute of the file changes from hot to cold, perform, on the file, transcoding storage processing from a second source coding algorithm to a second destination coding algorithm.

Restoration costs of the first destination coding algorithm are less than a restoration costs threshold. Restoration costs of the first source coding algorithm are not less than the restoration costs threshold. Storage overheads of the second destination coding algorithm are less than a storage overheads threshold. Storage overheads of the second source coding algorithm are not less than the storage overheads threshold.

Optionally, in this embodiment of the present invention, the execution module 520 is further configured to:

determine, as a first destination verification code, a result obtained by subtracting a first difference verification code from a first source verification code.

The file includes N data blocks. The first source verification code is generated by encoding the N data blocks based on a first encoding function. The first destination verification code is generated by encoding M data blocks in the N data blocks based on the first encoding function. The first difference verification code is generated by encoding data blocks other than the M data blocks in the N data blocks based on the first encoding function. The first encoding function is an encoding function based on the first source coding algorithm, N and M are positive integers, and N>M.

Optionally, in this embodiment of the present invention, the execution module 520 is further configured to:

determine, as a second destination verification code, a result obtained by adding a second source verification code to a second difference verification code.

The file includes N data blocks. The second source verification code is generated by encoding M data blocks in the N data blocks based on a second encoding function. The second destination verification code is generated by encoding the N data blocks based on the second encoding function. The second difference verification code is generated by encoding data blocks other than the M data blocks in the N data blocks based on the second encoding function. The second encoding function is an encoding function based on the second source coding algorithm, N and M are positive integers, and N>M.

It should be understood that the execution module 510 has a same function as the adaptive module and the EC module 205 in FIG. 2. The execution module 510 may be implemented by using a software program, for example, may be implemented by using the software program in a process; may be implemented by using a software module on a hardware chip; or may be implemented by using a combination of hardware and a software module. In this distributed file storage system, there may be one or more execution modules. When there is one execution module, the execution module may be integrated into a name node, or may be an independent module in the distributed file storage system. This is not limited in this embodiment of the present invention. When there are multiple execution modules, an execution module may be integrated into each data node, may be an independent module that is disposed for each data node and that is outside each data node, or the like. This is not limited in this embodiment of the present invention.

Therefore, according to the adaptive file storage apparatus in this embodiment of the present invention, transcoding storage processing can be performed on a file according to a cold and hot attribute of the file by using a corresponding coding technology. A requirement of the cold and hot attribute of the file for storage overheads and restoration costs can be fully considered. In addition, the used coding technology has high reliability and a high coding speed. Therefore, according to the adaptive file storage apparatus in this embodiment of the present invention, comprehensive performance in multiple dimensions of storage overheads, restoration costs, reliability, and an coding speed can be improved.

Figure 6:
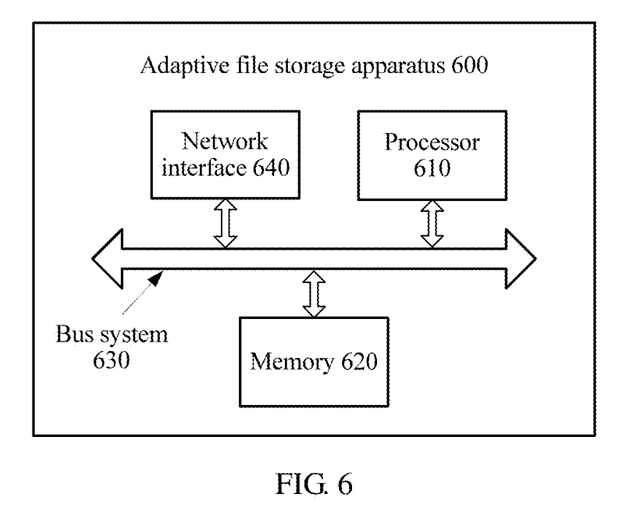
FIG. 6 is a schematic block diagram of an adaptive file storage apparatus according to another embodiment of the present invention.

As shown in FIG. 6, an embodiment of the present invention further provides a schematic block diagram of an adaptive file storage apparatus 600. The adaptive file storage apparatus 600 includes a processor 610, a memory 620, a bus system 630, and a network interface 640. The processor 610, the memory 620, and the network interface 640 are connected by using the bus system 630. The memory 620 is configured to store an instruction. The processor 610 is configured to execute the instruction stored in the memory 620, for example, a computer program. A communication connection between the processor 610 and at least one another network element is implemented by using the network interface 640 (may be wired or wireless). For example, the Internet, a wide area network, a local area network, or a metropolitan area network may be used. The processor 610 is configured to determine a cold and hot attribute of a file. The cold and hot attribute of the file represents an access frequency of the file. The processor 610 is further configured to perform encoding storage or transcoding storage processing on the file according to the cold and hot attribute of the file.

Therefore, according to the adaptive file storage apparatus in this embodiment of the present invention, storage processing can be performed on a file according to a cold and hot attribute of the file by using a corresponding coding technology. A requirement of the cold and hot attribute of the file for storage overheads and restoration costs can be fully considered. In addition, the used coding technology has high reliability and a high coding speed. Therefore, according to the adaptive file storage apparatus in this embodiment of the present invention, comprehensive performance in multiple dimensions of storage overheads, restoration costs, reliability, and an coding speed can be improved.

It should be understood that, in this embodiment of the present invention, the processor 610 may be a central processing unit (CPU), or the processor 610 may be another general processor, a digital signal processor (DSP), an application-specific integrated circuit (ASIC), a field programmable gate array (FPGA) or another programmable logic device, a discrete gate or a transistor logic device, a discrete hardware component, or the like. The general processor may be a microprocessor, or the processor may be any conventional processor, or the like.

The memory 620 may include a read-only memory and a random access memory, and may provide an instruction and data for the processor 610. A part of the memory 620 may further include a nonvolatile random access memory. For example, the memory 620 may further store device type information.

In addition to a data bus, the bus system 630 may include a power bus, a control bus, a status signal bus, and the like. However, for clarity of description, various buses are marked as the bus system 630 in the figure.

In an implementation process, the steps in the foregoing method may be completed by using an integrated logic circuit of hardware in the processor 610 or an instruction in a form of software. The steps of the method disclosed with reference to the embodiments of the present invention may be directly performed by a hardware processor, or may be performed by using a combination of hardware and a software module in the processor. The software module may be located in a mature storage medium in the field, such as a random access memory, a flash memory, a read-only memory, a programmable read-only memory, an electrically-erasable programmable memory, or a register. The storage medium is located in the memory 620. The processor 610 reads information in the memory 620, and completes the steps of the foregoing method in combination with hardware of the processor 610. To avoid repetition, details are not described herein again.

Optionally, in this embodiment of the present invention, the processor 610 is further configured to:

determine the cold and hot attribute of the file according to the access frequency of the file and/or an average access time interval of the file; and when the access frequency of the file is greater than a first frequency threshold, or the average access time interval of the file is less than a first time interval, determine that the cold and hot attribute of the file is hot; or when the access frequency of the file is not greater than a first frequency threshold, or the average access time interval of the file is not less than a first time interval, determine that the cold and hot attribute of the file is cold.

Optionally, in this embodiment of the present invention, the processor 610 is configured to:

when the cold and hot attribute of the file is hot, perform coding storage processing on the file by using a first coding algorithm; or when the cold and hot attribute of the file is cold, perform coding storage processing on the file by using a second coding algorithm.

Restoration costs of the first coding algorithm are less than a restoration costs threshold, and storage overheads of the second coding algorithm are less than a storage overheads threshold.

Optionally, in this embodiment of the present invention, the processor 610 is further configured to:

determine that a storage time of the file reaches a first time threshold and a quantity of access times of the file is less than a first quantity threshold.

Optionally, in this embodiment of the present invention, the processor 610 is further configured to:

perform transcoding processing on the file according to a change of the cold and hot attribute of the file.

Optionally, in this embodiment of the present invention, the processor 610 is configured to:

when the cold and hot attribute of the file changes from cold to hot, perform, on the file, transcoding storage processing from a first source coding algorithm to a first destination coding algorithm; or when the cold and hot attribute of the file changes from hot to cold, perform, on the file, transcoding storage processing from a second source coding algorithm to a second destination coding algorithm.

Restoration costs of the first destination coding algorithm are less than a restoration costs threshold. Restoration costs of the first source coding algorithm are not less than the restoration costs threshold. Storage overheads of the second destination coding algorithm are less than a storage overheads threshold. Storage overheads of the second source coding algorithm are not less than the storage overheads threshold.

Optionally, in this embodiment of the present invention, the processor 610 is further configured to:

determine, as a first destination verification code, a result obtained by subtracting a first difference verification code from a first source verification code.

The file includes N data blocks. The first source verification code is generated by encoding the N data blocks based on a first encoding function. The first destination verification code is generated by encoding M data blocks in the N data blocks based on the first encoding function. The first difference verification code is generated by encoding data blocks other than the M data blocks in the N data blocks based on the first encoding function. The first encoding function is an encoding function based on the first source coding algorithm, N and M are positive integers, and N>M.

Optionally, in this embodiment of the present invention, the processor 610 is further configured to:

determine, as a second destination verification code, a result obtained by adding a second source verification code to a second difference verification code.

The file includes N data blocks. The second source verification code is generated by encoding M data blocks in the N data blocks based on a second encoding function. The second destination verification code is generated by encoding the N data blocks based on the second encoding function. The second difference verification code is generated by encoding data blocks other than the M data blocks in the N data blocks based on the second encoding function. The second encoding function is an encoding function based on the second source coding algorithm, N and M are positive integers, and N>M.

Therefore, according to the adaptive file storage apparatus in this embodiment of the present invention, storage processing can be performed on a file according to a cold and hot attribute of the file by using a corresponding coding technology. A requirement of the cold and hot attribute of the file for storage overheads and restoration costs can be fully considered. In addition, the used coding technology has high reliability and a high coding speed. Therefore, according to the adaptive file storage apparatus in this embodiment of the present invention, comprehensive performance in multiple dimensions of storage overheads, restoration costs, reliability, and an coding speed can be improved.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method of adaptively storing a file that has either been stored in a multi-copy manner or stored using an erasure code (EC) technology, the method comprising:
   determining an attribute of the file, wherein the attribute of the file represents a frequency of accessing the file;
   performing coding storage processing on the file by using a first coding algorithm when the attribute of the file is hot;
   performing coding storage processing on the file by using a second coding algorithm when the attribute of the file is cold;
   performing, on the file, transcoding storage processing from a first source coding algorithm to a first destination coding algorithm when the attribute of the file changes from cold to hot, wherein the first source coding algorithm comprises the second coding algorithm and the first destination coding algorithm comprises the first coding algorithm; and
   converting a verification code corresponding to the first source coding algorithm into a verification code corresponding to the first destination coding algorithm, wherein the file is divided into multiple data blocks, and the data blocks are distributed to multiple data nodes; and wherein the verification code is stored in a node different from the multiple data nodes storing the data blocks of the file;
   wherein restoration costs of the first coding algorithm are less than a restoration costs threshold, and storage overheads of the second coding algorithm are less than a storage overheads threshold; restoration costs of the first destination coding algorithm are less than a restoration costs threshold, restoration costs of the first source coding algorithm are not less than the restoration costs threshold.

2. The method according to claim 1, wherein determining the attribute of the file comprises:
   when the access frequency of the file is greater than a first frequency threshold, or an average access time interval of the file is less than a first time interval, determining that the attribute of the file is hot; or
   when the access frequency of the file is not greater than a first frequency threshold, or the average access time interval of the file is not less than a first time interval, determining that the attribute of the file is cold.

3. The method according to claim 1, wherein further comprises:
   when the attribute of the file changes from hot to cold, performing, on the file, transcoding storage processing from a second source coding algorithm to a second destination coding algorithm,
   wherein storage overheads of the second destination coding algorithm are less than a storage overheads threshold, and storage overheads of the second source coding algorithm are not less than the storage overheads threshold.

4. The method according to claim 3, wherein the file comprises N data blocks, the performing, on the file, transcoding storage processing from a first source coding algorithm to a first destination coding algorithm comprises:
   determining, a first destination verification code corresponding to M data blocks in the N data blocks by subtracting a first difference verification code from a first source verification code, wherein
   the first source verification code is generated by encoding the N data blocks based on a first encoding function, the first difference verification code is generated by encoding data blocks other than the M data blocks in the N data blocks based on the first encoding function, the first encoding function is an encoding function based on the first source coding algorithm, N and M are positive integers, and N>M.

5. The method according to claim 3, wherein the file comprises N data blocks, the performing, on the file, transcoding storage processing from a second source coding algorithm to a second destination coding algorithm comprises:
   determining, a second destination verification code corresponding to the N data blocks by adding a second source verification code to a second difference verification code, wherein the second source verification code is generated by encoding M data blocks in the N data blocks based on a second encoding function, the second difference verification code is generated by encoding data blocks other than the M data blocks in the N data blocks based on the second encoding function, the second encoding function is an encoding function based on the second source coding algorithm, N and M are positive integers, and N>M.

6. The method according to claim 1, further comprising: determining that a storage time of the file reaches a first time threshold and a quantity of access times of the file is less than a first quantity threshold.

7. The method of claim 2, wherein the average access time interval is determined as the time between two sequential accesses to the file.

8. A non-transitory computer readable storage medium storing instructions which, when executed by a processor, cause the processor to store a file that has either been stored in a multi-copy manner or stored using an erasure code (EC) technology by causing the processor to:
   determine an attribute of a file, wherein the attribute of the file represents frequency of accessing the file;
   perform coding storage processing on the file by using a first coding algorithm when the attribute of the file is hot;
   perform coding storage processing on the file by using a second coding algorithm when the attribute of the file is cold;
   perform, on the file, transcoding storage processing from a first source coding algorithm to a first destination coding algorithm when the attribute of the file changes from cold to hot, wherein the first source coding algorithm comprises the second coding algorithm and the first destination coding algorithm comprises the first coding algorithm; and
   convert a verification code corresponding to the first source coding algorithm into a verification code corresponding to the first destination coding algorithm, wherein the file is divided into multiple data blocks, and the data blocks are distributed to multiple data nodes; and wherein the verification code is stored in a node different from the multiple data nodes storing the data blocks of the file;
   wherein restoration costs of the first coding algorithm are less than a restoration costs threshold, and storage overheads of the second coding algorithm are less than a storage overheads threshold; restoration costs of the first destination coding algorithm are less than a restoration costs threshold, restoration costs of the first source coding algorithm are not less than the restoration costs threshold.

9. The non-transitory computer readable storage medium according to claim 8, wherein when an access frequency of the file is greater than a first frequency threshold, or an average access time interval of the file is less than a first time interval, the attribute of the file is hot; or
   when the access frequency of the file is not greater than the first frequency threshold, or the average access time interval of the file is not less than the first time interval, the attribute of the file is cold.

10. The non-transitory computer readable storage medium according to claim 8, wherein
   when the attribute of the file changes from hot to cold, the transcoding storage processing is performed on the file from a second source coding algorithm to a second destination coding algorithm,
   wherein storage overheads of the second destination coding algorithm are less than a storage overheads threshold, and storage overheads of the second source coding algorithm are not less than the storage overheads threshold.

11. The non-transitory computer readable storage medium according to claim 9, wherein the average access time interval is determined as the time between two sequential accesses to the file.

12. An adaptive file storage apparatus configured to adaptively store a file that has either been stored in a multi-copy manner or stored using an erasure code (EC) technology, the apparatus comprising: a processor, and a memory storing instructions thereon that when executed by the processor, cause the processor to:
   determine an attribute of a file, wherein the attribute of the file represents a frequency of accessing the file;
   perform coding storage processing on the file by using a first coding algorithm when the attribute of the file is hot;
   perform coding storage processing on the file by using a second coding algorithm when the attribute of the file is cold;
   perform, on the file, transcoding storage processing from a first source coding algorithm to a first destination coding algorithm when the attribute of the file changes from cold to hot, wherein the first source coding algorithm comprises the second coding algorithm and the first destination coding algorithm comprises the first coding algorithm; and
   convert a verification code corresponding to the first source coding algorithm into a verification code corresponding to the first destination coding algorithm, wherein the file is divided into multiple data blocks, and the data blocks are distributed to multiple data nodes; and wherein the verification code is stored in a node different from the multiple data nodes storing the data blocks of the file;
   wherein restoration costs of the first coding algorithm are less than a restoration costs threshold, and storage overheads of the second coding algorithm are less than a storage overheads threshold; restoration costs of the first destination coding algorithm are less than a restoration costs threshold, restoration costs of the first source coding algorithm are not less than the restoration costs threshold.

13. The apparatus according to claim 12, wherein determining the attribute of the file comprises:
   when the access frequency of the file is greater than a first frequency threshold, or an average access time interval of the file is less than a first time interval, the attribute of the file is hot; or
   when the access frequency of the file is not greater than the first frequency threshold, or the average access time interval of the file is not less than the first time interval, the attribute of the file is cold.

14. The apparatus according to claim 12, wherein the processor is further configured to:
   when the attribute of the file changes from hot to cold, perform, on the file, the transcoding storage processing from a second source coding algorithm to a second destination coding algorithm, wherein
   storage overheads of the second destination coding algorithm are less than a storage overheads threshold, and storage overheads of the second source coding algorithm are not less than the storage overheads threshold.

15. The apparatus according to claim 14, wherein the file comprises N data blocks, the processor is configured to:
determine a first destination verification code corresponding to M data blocks in the N data blocks by subtracting a first difference verification code from a first source verification code, the first source verification code is generated by encoding the N data blocks based on a first encoding function, the first difference verification code is generated by encoding data blocks other than the M data blocks in the N data blocks based on the first encoding function, the first encoding function is an encoding function based on the first source coding algorithm, N and M are positive integers, and N>M.

16. The apparatus according to claim 14, wherein the file comprises N data blocks, the processor is configured to:
determine a second destination verification code corresponding to the N data blocks by adding a second source verification code to a second difference verification code,
wherein
the second source verification code is generated by encoding M data blocks in the N data blocks based on a second encoding function, the second difference verification code is generated by encoding data blocks other than the M data blocks in the N data blocks based on the second encoding function, the second encoding function is an encoding function based on the second source coding algorithm, N and M are positive integers, and N>M.

17. The apparatus according to claim 13, wherein the average access time interval is determined as the time between two sequential accesses to the file.

\* \* \* \* \*